June 4, 1968     M. A. PASTRICK     3,386,606
JUNCTION BOX
Filed Dec. 8, 1964     3 Sheets-Sheet 1
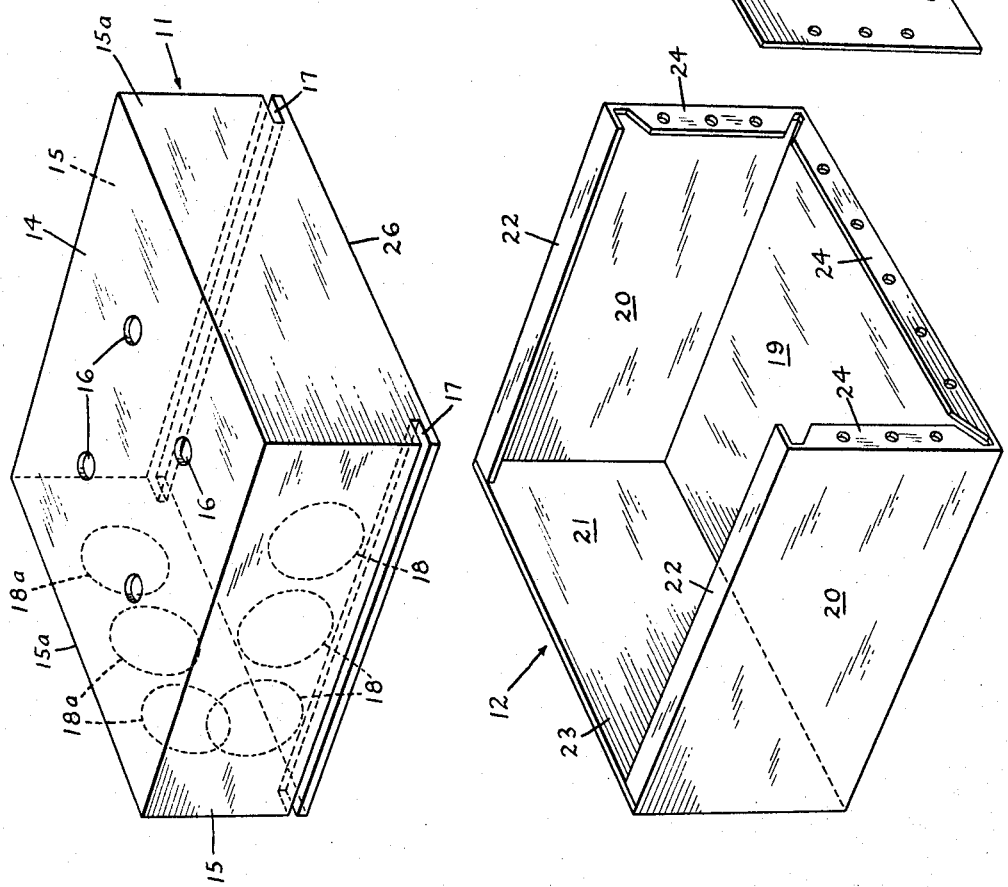
INVENTOR
MICHAEL A. PASTRICK
BY
ATTORNEY

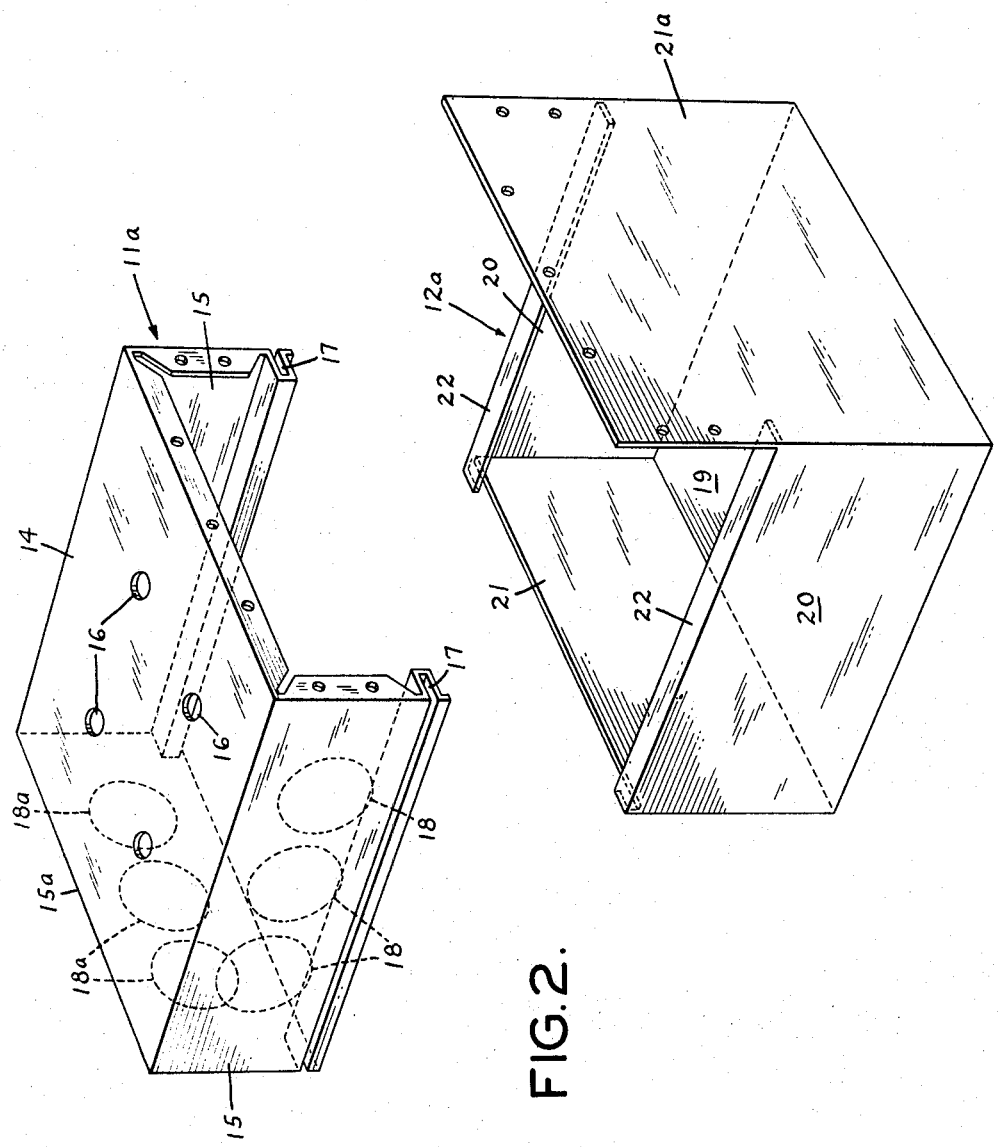

June 4, 1968　　　　　M. A. PASTRICK　　　　3,386,606
　　　　　　　　　　　　　JUNCTION BOX
Filed Dec. 8, 1964　　　　　　　　　　　　3 Sheets-Sheet 3
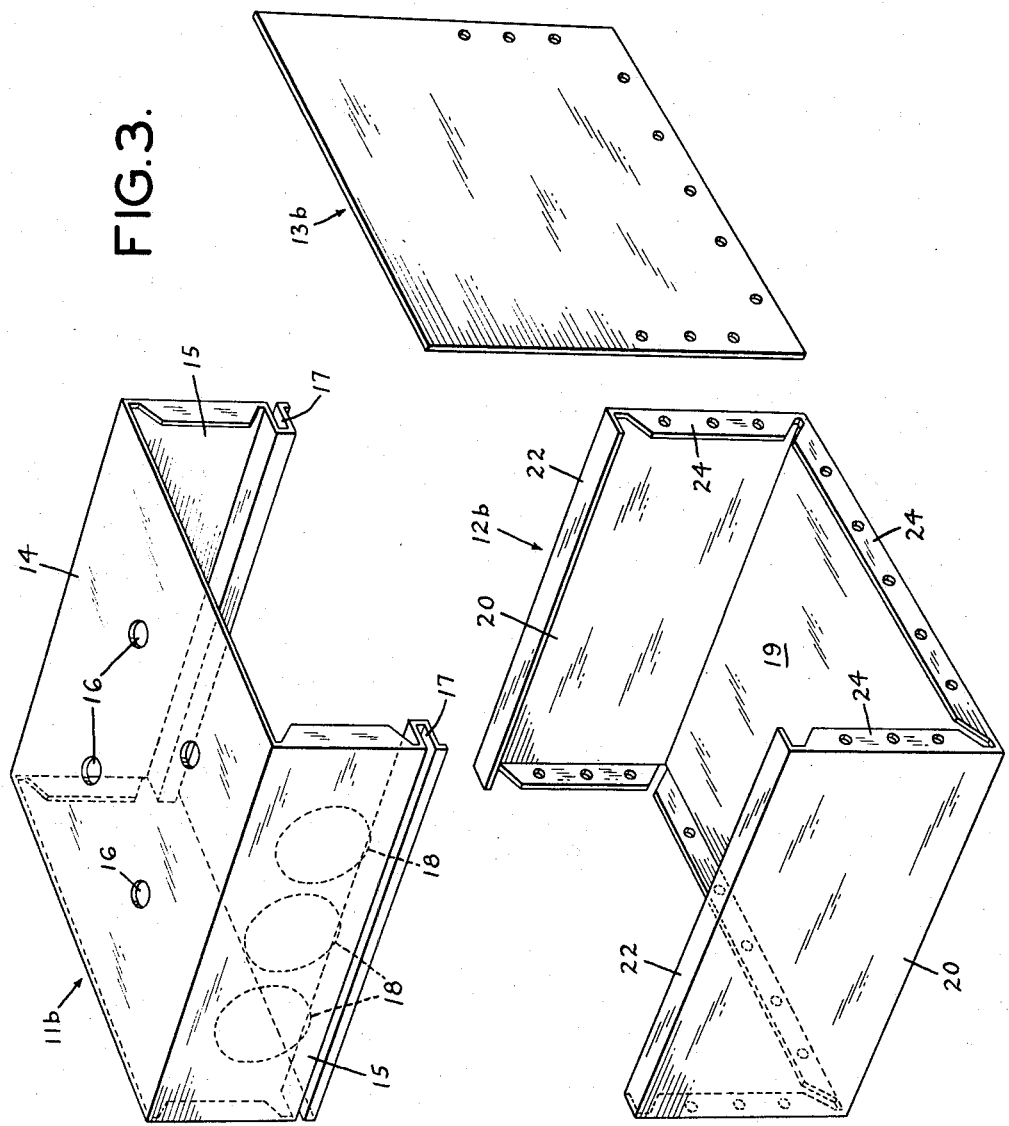
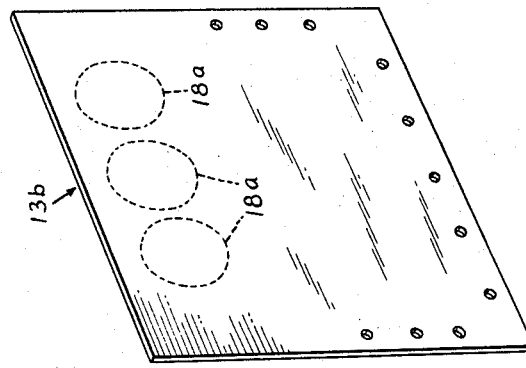
INVENTOR
MICHAEL A. PASTRICK
BY
ATTORNEY

3,386,606
JUNCTION BOX
Michael A. Pastrick, South Amboy, N.J.
(P.O. Box 307, Perth Amboy, N.J. 08862)
Filed Dec. 8, 1964, Ser. No. 416,813
3 Claims. (Cl. 220—3.94)

ABSTRACT OF THE DISCLOSURE

This invention is concerned with providing an improved electrical junction box. Briefly, the junction box comprises in combination a fixed housing member and a detachable housing member, both being provided with associated slidably engaging means, and said fixed housing member being further provided with cable-entry openings.

---

This invention relates to an electrical junction box. In particular, this invention relates to an electrical junction box especially adapted for the accommodation and servicing of circuitry carried by heavy electrical cables, such as are used in industrial power supplies.

In the typical industrial installation of a junction box for connecting heavy-duty electrical cables, the box is fastened to a ceiling or other overhead member such as a beam or the like, and is closed on the top and four sides, access being obtained through the bottom of the box. The electrical cable, usually encased in rigid tubular conduit, is led into the box horizontally, near the top of one side of the box, through suitable knock-out openings. A bushing is provided in the knock-out opening, which serves the dual purpose of providing means for fastening the end of the conduit to the box, and also of shielding the cable insulation from the relatively sharp edges of the knock-out opening.

In the use of such a junction box arrangement, the electrician draws the cable through the conduit and the bushing, and into the box, usually with the aid of a "fish" or "snake" to assist in drawing the cable through the conduit. Once the main feeds and the required tap-off cables are drawn into the box, the electrician makes the appropriate connections, and then closes the assembly by means of a cover plate adapted to be bolted onto the open bottom of the box.

The dimensions and relative proportions of a junction box of the type just described are dictated by a compromise among a number of desirables. Sufficient volume must be provided in the interior to accommodate the connections and the cable-end sections adjacent the connections. Cables of the type used in heavy-duty service are thick and stiff, and cannot be bent to a short radius of curvature without damaging the insulation, the conductors, or both. Whatever curves are required within the box to bring the appropriate ends together must therefore be large-radius curves and consequently require a considerable amount of volume within the box.

Also, due allowance must be made for the fact that the electrician must have a reasonable degree of access to the cable ends when making the connections, and therefore needs somewhat more length of cable in the box than would be required simply to bring the appropriate ends into juxtaposition.

On the other hand, it is desirable for various reasons that the construction of the box be compact in horizontal section, rather than a wide, shallow enclosure. The latter would take up an undesirably large amount of ceiling space, and would require larger amounts of material to enclose an equivalent volume of space, which would tend to make the construction more expensive.

In view of the above and other considerations, the typical junction box, as generally constructed at present, is more or less cubical in overall proportions, and open on the bottom. In making up the connections, the electrician bolts the top of the box from the inside to a suitable overhead support, inserts the bushings in the selected knock-out holes, fastens them with locknuts, and if necessary, fastens the ends of the conduits to the outside ends of the bushings. It will be noted that in bolting the box to the support, he is required to reach up inside the box. Unless the box is very large indeed, and thus sufficient to accommodate the head and shoulders, this operation must be carried out blind, and in an awkward position, which results in difficulties and some degree of danger by reason of slipping wrenches etc.

Having installed the housing, i.e., the box, bushings and conduits, the electrician then proceeds to draw the cables through the conduit and into the box. At this point, another difficulty arises. The cable is subjected to frictional engagement with the walls of the conduit throughout the length of the run leading to the box. Moreover, the cable is stiff and resistant to bending, which aggravates the difficulties in the case of a run of conduit containing bends. A very considerable degree of tension must therefore be exerted on the cable in order to draw the cable through the conduit.

In order to exert the necessary tension, the electrician is constrained by the conformation of the box to operate in one of two ways. If he wishes to exert a horizontal force, he must reach up into the box and attempt to pull the cable horizontally at right angles to the (vertical) position of his arm, or else he must pull the cable end (or a leader attached to the cable end) diagonally across the box to pass under the lower edge of the opposite wall. In the first case, he is unable to exert any effective degree of strength, and the approach of pulling horizontally from within the box is generally fruitless. In the second case, operating from outside the box, he is able to exert an effective pull. In the typical case, however (assuming that the box is roughly cubical), this force will be exerted at a downward angle in the neighborhood of 45° from the horizontal, so that only a fraction of the force exerted is effective to draw the cable horizontally into the box (i.e., the horizontal component of the exerted force).

Furthermore, when the cable is drawn into the box in this manner, it is drawn sharply over the inner lip of the bushing, which is equivalent to curving it, at least momentarily, over a very short radius. This leads to considerable danger of damaging the insulation, and some danger to the conductors as well.

The next operation after drawing the cable ends into the box is that of making the appropriate connections. As the conventional box is presently constructed, it is virtually impossible for the electrician to do this work up inside the box, so the usual practice is to draw into the box enough of each cable to extend downwardly approximately into the plane of the open bottom of the box. The connections are made in this plane, and then the cables are twisted back upward into the box in order to be clear of the cover plate when the latter is applied. In this position, the connections are not readily visible to the electrical inspector, who then must laboriously trace each cable inside the box to determine that all connections are properly made.

An object of this invention, therefore, is to provide an improved electrical junction box.

Another object is to provide a junction box into which cables may be drawn more easily than in conventional junction boxes.

Still another object is to provide a junction box of the type described, which is more easily attached to a supporting surface than conventional junction boxes.

Another object is to provide a junction box into which cables can be drawn without their being bent over short radii.

Another object still is to provide a junction box which provides improved economy in the amount of cable required to make connections.

Yet another object is to provide a junction box as described, which does not require otherwise unnecessary lengths of cable in order to make the connections accessible to the electrician.

Another object is to provide a junction box which may be closed without preliminary distortion of the disposition of connected cables.

A further object is to provide a junction box in which completed connections may be conveniently inspected from outside the box.

A feature of the invention is the use of a fixed housing member and a detachable housing member.

Another feature is the use of a pair of housing members of such configuration that they may be juxtaposed to form at least part of a complex junction box.

Another feature is the use of a fixed housing member to accommodate the entry points of cables into the box and a detachable housing member which may be removed to permit making, changing or inspection of electrical connections and which may be replaced without disturbing said connections.

Still another feature is the use of slidable engaging means to permit said detachable housing means to be connected to said fixed housing means or released therefrom by a simple horizontal sliding motion.

Another feature is the use of one or more generally vertical cover plates to close any side of the box not completely enclosed by cooperation of said fixed and said detachable housing member.

Other objects, features and advantages will become apparent from the following more complete description and claims, and with reference to the accompanying drawings, in which parts appearing in more than one view have been given the same reference numeral throughout.

The invention consists in the form, selection, combination and arrangement of parts, as hereinafter more fully set forth.

In one particularly desirable aspect, this invention contemplates an electrical junction box comprising in combination a fixed housing member and a detachable housing member; said fixed housing member having a generally horizontal top and at least two generally vertical and oppositely disposed sidewalls, at least two cable-entry openings in said sidewalls, and first slidable engaging means for releasably connecting said fixed housing member with said detachable housing member; said detachable housing member having at least two generally vertical and oppositely disposed sidewalls and a generally horizontal bottom, said sidewalls having substantially the same horizontal dimensions and horizontal distance between walls as said sidewalls of said fixed housing member, said sidewalls of said detachable housing member being provided with second slidable engaging means, said first and second slidable engaging means cooperating to hold said detachable housing member in subjacent contiguous relationship with said fixed housing member and to permit detaching said detachable housing member from said fixed housing member by sliding said detachable housing member in a generally horizontal direction.

Referring now to the figures:

FIGURE 1 is an exploded perspective view of a junction box according to one embodiment of the invention.

FIGURE 2 is an exploded perspective view of a junction box according to another embodiment of the invention.

FIGURE 3 is an exploded perspective view of a junction box according to still another embodiment of the invention.

Referring now more particularly to FIGURE 1, the junction box of this invention is shown as comprising a fixed housing member 11, a detachable housing member 12, and a cover plate 13.

Fixed housing member 11 is in the form of a box-like structure having a top 14, two sides 15 and two ends 15$^a$, the bottom being open. Top 14 is provided with means, represented by bolt-holes 16, for attaching fixed housing member 11 to an overhead structural member such as beam, ceiling or the like.

Near the lower edges of sides 15 of the fixed housing member are longitudinal channels 17, provided for a purpose which will presently be described.

Appropriate conventional knock-outs 18 are provided in at least one of sides 15 or ends 15$^a$. In accordance with conventional practice, such knock-outs will be provided in both of sides 15 and in both of ends 15$^a$ (knock-outs 18$^a$), to provide flexibility for accommodating various wiring layouts. Those knock-outs which are not to be used for the admission of cables to the box, in any particular installation, are simply left intact.

Detachable housing member 12, as also illustrated in FIGURE 1, is a box-like structure having a bottom 19, two sides 20, and an end 21, the top and one end being open. Sides 20 are substantially equal in length to sides 15 of fixed housing member 11, and end 21 is substantially equal in length to ends 15$^a$ of fixed housing member 11.

The upper edges of sides 20 are turned inwardly to form flanges 22, of a size to fit slidingly into channels 17 in the sides of fixed housing member 11.

End 21 of the detachable member may be provided with an offset, vertical flange 23, adapted to bear against an end 15$^a$ of the fixed housing member, thus making it possible to slide flanges 22 into channels 17 in one direction only—i.e., with the open end of the detachable housing member leading.

The open end of the detachable housing member, defined by the edges of sides 20 and bottom 19, is provided with means represented by perforated flanges 24, for attaching a cover plate thereto.

Cover plate 13, as also illustrated in FIGURE 1, is of a size to close the open end of fixed housing member 12, and as illustrated, is provided with perforations matching those in flanges 24, to facilitate attachment of the cover plate by the use of machine screws, sheet-metal screws, or other appropriate fastener.

Cover plate 13 may also be provided with an offset vertical flange 25 adapted to bear against one of ends 15$^a$ of the fixed housing member. When both flange 23 on the upper edge of end 21 and flange 25 on the upper edge of cover plate 13 are provided, each bears against one of ends 15$^a$ of the fixed housing member, so that flanges 22 are not free to slide in either direction within channels 17, once the cover plate is fastened to the detachable housing member.

In using the junction box of this invention as illustrated in FIGURE 1, the electrician first anchors the fixed housing member to a suitable overhead structural member by means of bolts, U-bolts, or the like, through bolt-holes 16. This operation is greatly facilitated by the fact that the only part of the junction box housing structure then in place is the relatively shallow fixed housing member 11. Thus the electrician is not called upon to reach up inside a confined spaced defined by the depending walls of the conventional junction box, and has much greater freedom of movement in making up the bolted fastenings.

The appropriate knock-outs are then punched out, if this has not already been done, and conventional bushings are inserted in the knock-out openings and secured with lock nuts. The external conduits are suitably secured to the bushings and the cable is drawn through, usually with the aid of a "fish" or "snake."

Drawing through of the cable is also greatly facilitated (as compared with conventional practice) because of the relatively shallow structure of the fixed housing member. Referring to FIGURE 1, for example, it will readily be seen that in drawing a cable through one of the end knockout openings 18ª, a pull can be exerted from a high point in the vicinity of the lower edge 26 of the opposite end 15ª, instead of the much lower point that would be required if the entire opposite end wall of the box were in place. Because the pull is exerted from a higher point, the force exerted has a proportionately higher horizontal component, and is therefore more effective, and requires less physical effort on the part of the electrician.

Moreover, also because the pull is exerted from a higher point than in conventional practice, the cable is bent only gently as it enters the box, and the vertical component of the pulling force, which would tend to scrape it forcefully over the lip of the bushing, is correspondingly smaller. This results in minimized danger of damage to the insulation and/or the conductors.

Once the cable ends are well drawn into the upper housing member, the electrician juxtaposes the proper ends and makes the connections in conventional manner. It will be noted that, in order to make the connections, he needs only enough length of cable to bring the proper ends together, plus the slight additional length consumed in making the connections themselves. This is in contrast to conventional practice, which normally requires that each of the cables be drawn into the box far enough to reach all the way to the plane of the bottom of the final enclosure, in order for the electrician to be able to effectively work on it from outside.

When the connections have been made, the electrician connects the detachable housing member 12 to the fixed housing member 11, by sliding flanges 22 into channels 17 (open end of member 12 first, if flange 23 has been provided). It will be noted that in the normal case, providing only a reasonable amount of cable has been drawn into the box, this operation does not require distortion of the cables. Rather, the detachable housing member merely surrounds the connectable cables without touching or otherwise disturbing them.

Finally, the cover plate is applied and fastened in place. This merely closing the housing, again without disturbing the cables within. If vertical flange 25 has been provided, it also prevents removal of the detachable housing member until such time as the cover has been first removed.

For inspection and servicing purposes, cover plate 13 may be removed, or for fuller accessibility, the entire detachable housing member 12 may be removed, leaving the connected cables completely exposed to view in the same condition as when first connected by the electrician. The connections may be covered and re-exposed, without any necessity of distorting the cables once the connections are made.

FIGURE 2 shows another embodiment of the invention.

In the embodiment as shown in FIGURE 2, no separate cover plate is provided, the cover plate being an integral part of the detachable housing member.

As shown in FIGURE 2, the fixed housing member 11ª is similar to that shown in FIGURE 1, except that one of the ends 15ª is omitted, so that the fixed housing member in this case comprises a top, two sides and one end, the other end and the bottom being left open.

In this embodiment, the detachable housing member 12ª is also similar to detachable housing member 12 of FIGURE 1, except in that instead of an open end, it has a closed end 21ª, opposite end 21. Moreover, end 21ª is of different form from end 21, in that it extends up higher than end 21 and sides 20, and in fact projects up high enough to serve as a cover plate for the open end of fixed housing member 11ª. Vertical flange 23 is necessarily omitted from the top of end 21 in this embodiment, because the presence of upwardly-projecting end 21ª necessitates that flanges 22 be inserted into channels 17 in such a way that end 21 is the leading end.

The manner of using the invention in the embodiment of FIGURE 2 is substantially identical with the above-described manner of using the embodiment of FIGURE 1. After the electrical connections are made and the detachable housing member 12ª assembled to fixed housing member 11ª by sliding flanges 22 into channel 17, the upper portion of end 21ª is fastened to fixed housing member 11ª by the use of machine screws, sheet metal screws or the like.

As in the case of the embodiment of FIGURE 1, the assembly of the junction box may be completed after the electrical connections are complete, without disturbing the connections or distorting the cables. Similarly, the junction box may be partially disassembled by removing detachable housing member 12ª and reassembled by replacing the same, as often as may be desired for inspection or service, without disturbing the cables or connections.

FIGURE 3 shows still another embodiment of the invention, in which the fixed housing member 11ᵇ comprises a top 14 and two sides 15, both ends being open.

Detachable housing member 12ᵇ, in the embodiment of FIGURE 3, comprises a bottom 19 and two sides 20, both ends being open.

Fixed housing member 11b is provided with knockout openings and channels, and detachable housing member 12ᵇ is provided with flanges to slide into the channels, as in the embodiments previously described.

To close the open ends of the fixed and detachable housing members, in the embodiment of FIGURE 3, there are provided a pair of cover plates 13ᵇ, each of which is of a height corresponding to the combined sidewall heights of fixed housing member 11ᵇ and detachable housing member 12ᵇ, and each of which is of a width corresponding to the distance between said sidewalls. Conventional means, such as perforated flanges to receive machine screws or the like, are provided for the purpose of anchoring the cover plates to the open ends of the fixed housing member as well. If the cover plates are screwed onto both the detachable housing member and the fixed housing member, a somewhat stronger structure results. However, if the cover plates are screwed only to the detachable housing member, the resulting structure is sufficiently strong for all practical purposes, and disassembly of the box for inspection or servicing is facilitated, because only one cover plate need be removed in order to remove the detachable housing member.

In using the embodiment of FIGURE 3, the procedure is the same as that previously discussed, except that after sliding flanges 22 into channels 17 and thus uniting the detachable with the fixed housing member, the electrician then fastens a cover plate 13ª onto each open end of the detachable housing member (and, if desired, onto the corresponding open end of the fixed housing member as well).

For inspection or servicing, either or both cover plates may be removed, and if desired, the detachable housing member may also be removed quickly and easily, and subsequently replaced with equal ease, all without in any way disturbing the cables or their connections contained in the box.

As shown in the drawings, the channels are formed in the fixed housing member and the cooperating flanges form part of the detachable housing member. However, it will be obvious to those skilled in the art that the channels may be formed in the detachable housing member and the flanges in the fixed housing member, if so desired, or the fixed housing member may have a channel on one side and a flange on the other, cooperating respectively with a flange and a channel on the detachable housing member. Also, the flanges and channels are shown as projecting inwardly from the plane of the sidewalls, which is generally preferred for the sake of appearance. Obviously, both may equally well project outwardly from the plane of the sidewalls.

Moreover, it is within the contemplation of the invention to use other types of releasable fastener to unite the fixed and detachable housing members, for example bolts, machine screws or snap-fasteners of the type used on luggage and the like. For reasons of convenience and sturdy construction, however, I consider the best way of practicing the invention to be the use of channels and flanges, as illustrated in the drawings.

The dimensions of the complete junction box depend on the number and sizes of cables that must be accommodated. In general, a junction box according to this invention may be somewhat smaller in overall dimensions than a box of conventional design for the same installation, because of the fact above noted, that the design of the present invention eliminates the need for the electrician to pull into the box lengths of otherwise unneeded cable, merely to get the cable ends down to a point where he can work on them.

The fixed housing member and the detachable housing member should ordinarily be the same size and shape in horizontal plan, in order that they may cooperate to form a unitary, straight-walled, boxlike structure. This design may be departed from in certain cases where unusual circumstances warrant—for example to avoid structural obstructions.

The minimum height of the fixed housing member is determined by the size of the cables, and conduits, to be accommodated. The sides 15 and ends 15ᵃ of this member must contain knockouts sufficiently large to accommodate the desired cables and conduits, plus the necessary bushings, and there must be an allowance above and below each of the knock-outs to preserve the structural integrity of the member. The vertical height of the fixed housing member may be greater if desired, but preferably should be kept as small as feasible, to take best advantage of the invention.

The vertical height of the detachable housing member is not critical, and is determined by the volume of space required for the cables, over and above that provided within the fixed housing member. In a typical installation, the vertical height of the detachable housing member is 2 to 3 times that of the fixed housing member.

The foregoing description in describing, "vertical" and "horizontal" measurements, has assumed that the junction box is mounted against a ceiling, or other overhead structural member such as a beam or the like. It will be understood, however, that the box may equally well be mounted on a vertical wall or joist, or elsewhere, as required for the particular installation, while retaining the full advantages of the invention.

While this invention has been described with reference to certain preferred embodiments and illustrated by way of certain drawings, it is to be understood that these are illustrative only, as many alternatives and equivalents will readily occur to those skilled in the art, without departing from the spirit and scope of the invention. The invention is therefore not to be construed as limited, except as set forth in the appended claims.

I claim:

1. An electrical junction box comprising in combination a fixed housing member having a generally horizontal top, two generally vertical, parallel sidewalls and two generally vertical, parallel ends, said sidewalls and said ends containing among them at least two cable-entry openings; a detachable housing member having a bottom of size and shape generally similar to the size and shape of said top of said fixed housing member, two generally vertical parallel sidewalls, and one generally vertical end; a cover plate of size and shape generally similar to the size and shape of said end of said detachable housing member; means for releasably securing said detachable housing member in subjacent contiguous relationship with said fixed housing member; and means for releasably securing said cover plate to said bottom and said sides of said detachable housing member, said cover plate comprising a flat plate containing opening means for holding fastening means for releasably securing said cover plate to said bottom and said sides of said detachable housing member onto inwardly directed flanges extending therefrom, said inwardly directed flanges containing opening means substantially in registry with said cover plate opening means, said fastening means releasably securing said cover plate and said inwardly directed flanges by means of said registered opening means.

2. A junction box according to claim 1, wherein said sidewalls and said end of said detachable housing member have vertical dimensions substantially exceeding the corresponding dimensions of said sidewalls and said ends of said fixed housing member.

3. An electrical junction box comprising in combination a fixed housing member having a generally horizontal top, two generally vertical, parallel sidewalls and two generally vertical, parallel ends, said sidewalls and said ends containing among them at least two cable-entry openings; a detachable housing member having a bottom of size and shape generally similar to the size and shape of said top of said fixed housing member, two generally vertical parallel sidewalls, and one generally vertical end; a cover plate of size and shape generally similar to the size and shape of said end of said detachable housing member, said cover plate comprising a flat plate containing opening means for holding fastening means; means for releasably securing said detachable housing member in subjacent contiguous relationship with said fixed housing member comprising longitudinal outwardly disposed channels provided at the lower edge of said sidewalls of said fixed housing member and horizontally inwardly directed flanges provided at the upper edge of said side walls of said detachable housing member said flanges being slidably and releasably engageable in said channels; and means for releasably securing said cover plate to said bottom and said sides of said detachable housing member comprising inwardly directed flanges extending from said bottom and sides at the end opposite said vertical end of said detachable housing member, said inwardly directed flanges containing opening means substantially in registry with said opening means in said cover plate, and fastening means releasably securing said cover plate to said inwardly directed flanges by means of said registered opening means.

References Cited

UNITED STATES PATENTS

| | | | |
|---|---|---|---|
| 1,235,069 | 7/1917 | Skinner | 220—3.8 X |
| 1,486,415 | 3/1924 | Casper | 220—41 |
| 2,804,986 | 9/1957 | Jeffers et al. | 220—3.8 X |
| 2,881,940 | 4/1959 | Hamilton | 220—3.8 X |
| 2,906,579 | 9/1959 | Magnenst | 220—41 X |
| 2,924,639 | 2/1960 | Zelt | 220—3.8 X |
| 2,929,530 | 3/1960 | Sargent | 220—41 X |
| 3,033,913 | 5/1962 | Dietze | 174—50 X |
| 3,272,978 | 9/1966 | Jackson | 174—52 X |

FOREIGN PATENTS 840,184   7/1960   Great Britain.

THERON E. CONDON, *Primary Examiner.*

JOSEPH R. LECLAIR, JAMES R. GARRETT,
*Examiners.*